United States Patent
Hosoya

(10) Patent No.: US 6,907,775 B2
(45) Date of Patent: Jun. 21, 2005

(54) DIAGNOSIS APPARATUS AND METHOD OF FUEL PUMP FOR INTERNAL COMBUSTION ENGINE

(75) Inventor: Hajime Hosoya, Atsugi (JP)

(73) Assignee: Hitachi, Ltd., Tokyo-to (JP)

( * ) Notice: Subject to any disclaimer, the term of this patent is extended or adjusted under 35 U.S.C. 154(b) by 13 days.

(21) Appl. No.: 10/730,030

(22) Filed: Dec. 9, 2003

(65) Prior Publication Data

US 2004/0112126 A1 Jun. 17, 2004

(30) Foreign Application Priority Data

Dec. 9, 2002 (JP) ........................................ 2002-356467

(51) Int. Cl.$^7$ ............................................ G01M 15/00
(52) U.S. Cl. .................................................. 73/119 R
(58) Field of Search .......................... 73/112, 113, 115, 73/116, 117.2, 117.3, 118.1, 119 R, 119 A

(56) References Cited

U.S. PATENT DOCUMENTS

| | | | | |
|---|---|---|---|---|
| 4,061,027 A | * | 12/1977 | Emerson | 73/119 A |
| 4,387,589 A | * | 6/1983 | Larson | 73/119 A |
| 4,827,897 A | * | 5/1989 | Yamada et al. | 123/497 |
| 5,633,457 A | * | 5/1997 | Kilar et al. | 73/119 A |
| 5,770,796 A | * | 6/1998 | Sakamoto et al. | 73/119 A |

FOREIGN PATENT DOCUMENTS

JP 63-052962 U 4/1988

* cited by examiner

Primary Examiner—Eric S. McCall
(74) Attorney, Agent, or Firm—Foley & Lardner LLP

(57) ABSTRACT

When a fuel pressure on the downstream side of a fuel pump for an internal combustion engine is less than a slice level, it is judged whether or not an applied voltage on a motor unit and/or the power consumption in the motor unit are normal. In the case where the motor unit is not failed, it is estimated that the pump unit is failed.

14 Claims, 2 Drawing Sheets

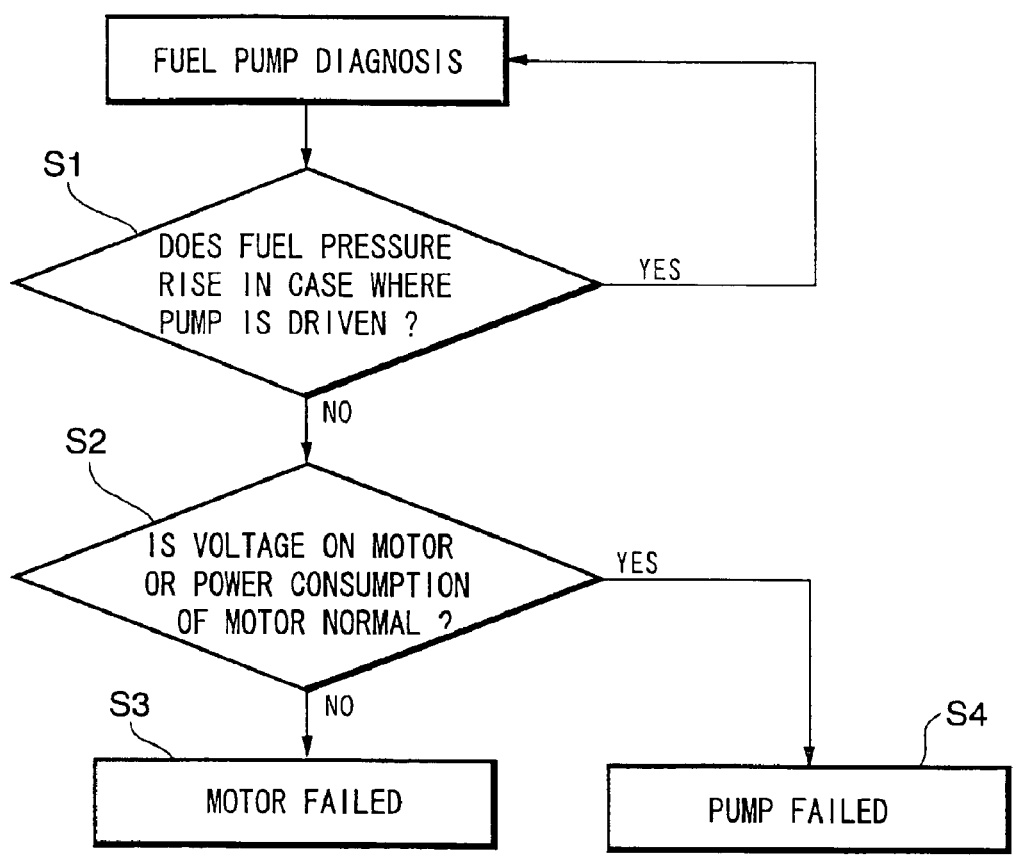

DIAGNOSIS APPARATUS AND METHOD OF FUEL PUMP FOR INTERNAL COMBUSTION ENGINE

FIELD OF THE INVENTION

The present invention relates to a diagnosis apparatus and a diagnosis method of a fuel pump supplying fuel to an internal combustion engine.

RELATED ART OF THE INVENTION

Japanese Unexamined Utility Model Publication No. 63-052962 discloses an apparatus provided with a device detecting a discharge pressure of a fuel pump, for diagnosing an abnormality in the fuel pump based on the discharge pressure.

There is a case where a motor unit and a pump unit both constituting a fuel pump are constructed to be exchangeable separately.

In the case where such a fuel pump is used, if a failure diagnosis can be performed for each unit, it is possible to exchange only a failed unit.

However, there are cases where a normal discharge pressure cannot be obtained due to a failure of motor unit, and where the normal discharge pressure cannot be obtained due to a failure of pump unit.

Therefore, in the constitution where the diagnosis is performed based on the discharge pressure as in a conventional diagnosis apparatus, it is impossible to judge which unit is failed, the motor unit or the pump unit.

Consequently, conventionally, if the occurrence of failure is diagnosed, both the motor unit and pump unit are exchanged simultaneously, resulting in that a unit which is not failed is exchanged unnecessarily.

SUMMARY OF THE INVENTION

It is therefore an object of the present invention to provide a diagnosis apparatus and a diagnosis method capable of diagnosing which unit is failed, a motor unit or a pump unit.

In order to accomplish the above-mentioned object, according to the present invention, a function of a fuel pump is diagnosed, and if it is diagnosed that the function of the fuel pump is abnormal, then it is diagnosed whether or not a fuel pump is abnormal.

Then, when it is diagnosed that the motor unit is abnormal, a signal indicating a failure of the motor unit is output, while when it is judged that the motor unit is normal, a signal indicating a failure of the pump unit is output.

The other objects and features of the invention will become understood from the following description with reference to the accompanying drawings.

BRIEF DESCRIPTION OF THE DRAWINGS

FIG. 2 is a flowchart of a failure diagnosis of a fuel pump.

DESCRIPTION OF THE PREFERRED EMBODIMENT

Figure 1:
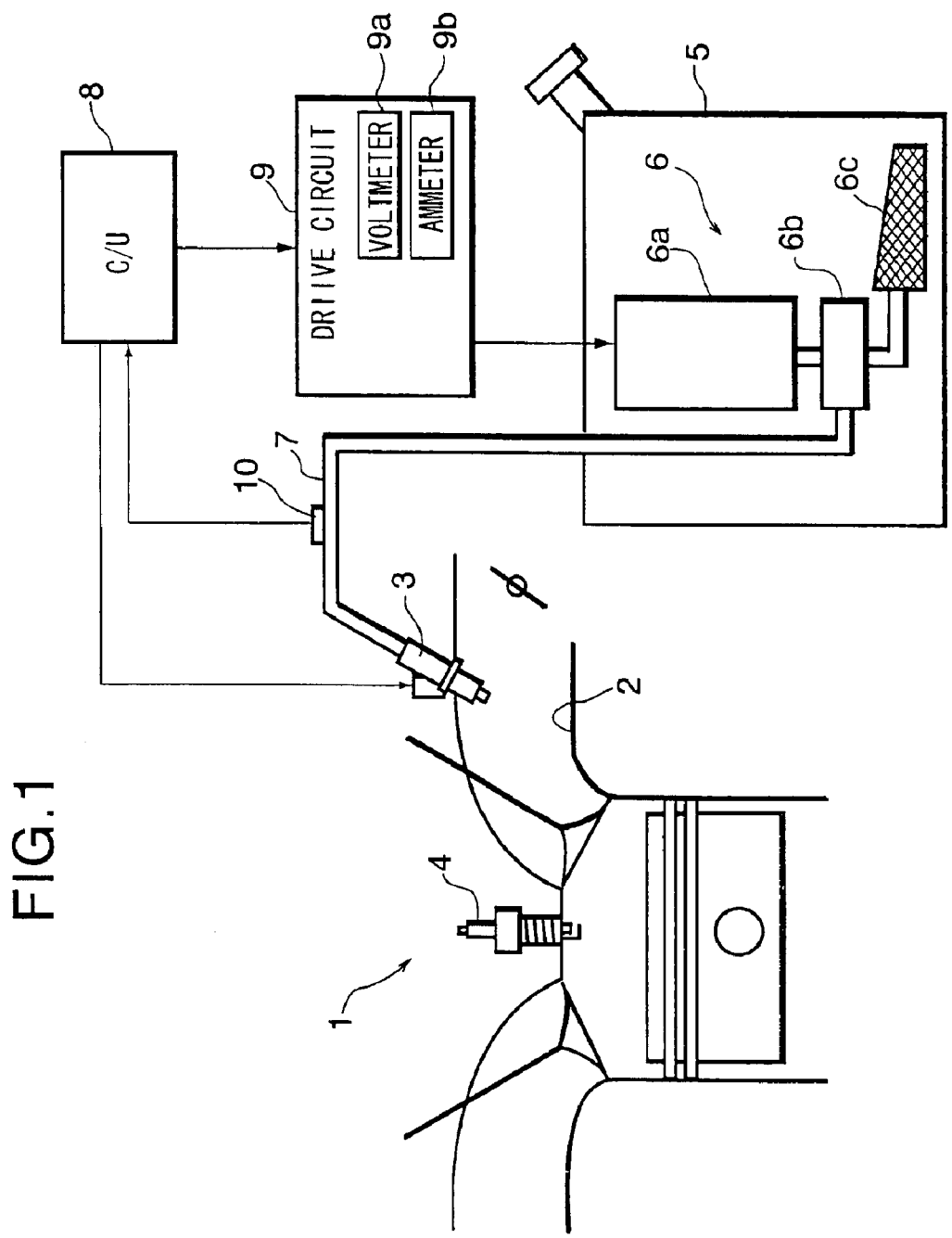
FIG. 1 is a schematic diagram of an internal combustion engine to which a diagnosis apparatus according to the present invention is applied.

In an internal combustion engine 1 shown in FIG. 1, an electromagnetic type fuel injection valve 3 is disposed on an intake port 2.

Fuel is injected by fuel injection valve 3, to form an air-fuel mixture inside a combustion chamber of engine 1.

The air-fuel mixture is burnt by a spark ignition by an ignition plug 4.

The fuel inside a fuel tank 5 is sucked by a fuel pump 6 disposed inside fuel tank 5, and the fuel discharged from fuel pump 6 is sent to fuel injection valve 3 via fuel piping 7.

Fuel pump 6 consists of a motor unit 6a and a pump unit 6b.

Motor unit 6a and pump unit 6b are constructed separately from each other and therefore are exchangeable separately.

A turbine type pump sucking and discharging fuel in accordance with the rotation of an impeller is used as pump unit 6b.

Numeral 6c denotes a fuel filter disposed on a suction port of pump unit 6b.

Motor unit 6a is supplied with the electric power via a drive circuit 9 that is controlled by a control unit 8.

Control unit 8 comprises a microcomputer.

Control unit 8 controls an applied voltage on motor unit 6a, and also controls fuel injection timing and a fuel injection quantity of fuel injection valve 3.

Further, control unit 8 performs a failure diagnosis of fuel pump 6 as shown in a flowchart of FIG. 2.

In step S1, it is judged whether or not a fuel pressure inside fuel piping 7 normally rises in a state where fuel pump 6 is driven.

Specifically, it is judged whether or not a detection value of a fuel pressure sensor 10 detecting the fuel pressure inside fuel piping 7 reaches a predetermined slice level or above.

The slice level is variably set according to a drive control signal for fuel pump 6.

When it is judged in step S1 that the fuel pressure reaches the slice level or above, control returns step S1, where the judgment of fuel pressure is repeatedly performed.

On the other hand, when it is judged in step S1 that the fuel pressure is lower than the slice level, it is judged that a function of fuel pump 6 is abnormal, and then control proceeds to step S2.

In step S2, it is judged whether or not the applied voltage on motor unit 6a is normal, and/or whether or not the power consumption in motor unit 6a is normal.

Note, the applied voltage and the power consumption are judged based on detection results by a voltmeter 9a and an ammeter 9b both disposed in drive circuit 9.

Since the abnormality of fuel pressure (functional abnormality in fuel pump) is detected in step S1, it is estimated that either motor unit 6a or pump unit 6b is failed.

It is impossible to specify which unit is failed, motor unit 6a or pump unit 6b, based on the fuel pressure.

However, when it is judged in step S2 that the applied voltage on motor unit 6a and/or the power consumption in motor unit 6a is abnormal, it is estimated that the functional abnormality in fuel pump 6 is caused by the failure of motor unit 6a.

On the other hand, when it is judged in step S2 that the applied voltage on motor unit 6a and/or the power consumption in motor unit 6a is normal, the fuel pressure is lower than the slice level, although motor unit 6a is normal. Accordingly, it is estimated that the functional abnormality in fuel pump is caused by the failure of pump unit 6b.

Therefore, when it is judged in step S2 that the applied voltage on motor unit 6a and/or the power consumption in motor unit 6a is abnormal, control proceeds to step S3, where a failure judging signal of motor unit 6a is output.

On the other hand, when it is judged in step S2 that the applied voltage on motor unit 6a and/or the power consumption in motor unit 6a is normal, control proceeds to step S4, where a failure judging signal of pump unit 6b is output.

A result of failure diagnosis is stored in control unit 8.

Further, when the occurrence of failure is diagnosed, a warning is given to a driver by a warning device.

Since it is judged whether motor unit 6a is failed or pump unit 6b is failed in fuel pump 6, and further, motor unit 6a and pump unit 6b are constructed to be exchangeable separately, it is possible to exchange only a unit that has been diagnosed as failed.

Consequently, a normal unit is not exchanged unnecessarily.

In the present embodiment, fuel pump 6 is disposed inside fuel tank 5. However, the constitution may be such that fuel pump 6 is disposed outside fuel tank 5.

The entire contents of Japanese Patent Application No. 2002-356467 filed on Dec. 9, 2002, a priority of which is claimed, are incorporated herein by reference.

While only a selected embodiment has been chosen to illustrate the present invention, it will be apparent to those skilled in the art from this disclosure that various changes and modifications can be made herein without departing from the scope of the invention as defined in the appended claims.

Furthermore, the foregoing description of the embodiment according to the present invention is provided for illustration only, and not for the purpose of limiting the invention as defined in the appended claims and their equivalents.

What is claimed are:

1. A diagnosis apparatus of a fuel pump for an internal combustion engine, provided with a motor unit and a pump unit, comprising:
   a first diagnosis device diagnosing a function of said fuel pump;
   a second diagnosis device diagnosing whether or not said motor unit is abnormal when it is diagnosed by said first diagnosis device that the function of said fuel pump is abnormal; and
   a diagnosis signal output device outputting a signal indicating a failure of said motor unit when it is diagnosed by said second diagnosis device that said motor unit is abnormal, and outputting a signal indicating a failure of said pump unit when it is diagnosed by said second diagnosis device that said motor unit is normal.

2. A diagnosis apparatus of a fuel pump for an internal combustion engine according to claim 1,
   wherein said first diagnosis device comprises:
   a pressure detector detecting a fuel pressure on the downstream side of said fuel pump; and
   a judging device judging that the function of said fuel pump is abnormal when the fuel pressure detected by said pressure detector is less than a slice level.

3. A diagnosis apparatus of a fuel pump for an internal combustion engine according to claim 2,
   wherein said first diagnosis device further comprises;
   a slice level setting device variably setting said slice level according to a drive control signal for said fuel pump.

4. A diagnosis apparatus of a fuel pump for an internal combustion engine according to claim 1,
   wherein said second diagnosis device comprises:
   a voltage detector detecting a voltage applied on said monitor unit; and
   a judging device judging an abnormality in the voltage detected by said voltage detector as an abnormality in said motor unit.

5. A diagnosis apparatus of a fuel pump for an internal combustion engine according to claim 1,
   wherein said second diagnosis device comprises:
   a power consumption detector detecting the power consumption in said motor unit; and
   a judging device judging an abnormality in the power consumption detected by said power consumption detector as an abnormality in said motor unit.

6. A diagnosis apparatus of a fuel pump for an internal combustion engine according to claim 1, further comprising;
   a warning device giving a warning based on a signal output from said diagnosis signal output device.

7. A diagnosis apparatus of a fuel pump for an internal combustion engine according to claim 1,
   wherein the motor unit and the pump unit in said fuel pump are constructed to be exchangeable separately.

8. A diagnosis apparatus of a fuel pump for an internal combustion engine, provided with a motor unit and a pump unit, comprising:
   first diagnosis means for diagnosing a function of said fuel pump;
   second diagnosis means for diagnosing whether or not said motor unit is abnormal when it is diagnosed by said first diagnosis means that the function of said fuel pump is abnormal; and
   diagnosis signal output means for outputting a signal indicating a failure of said motor unit when it is diagnosed by said second diagnosis means that said motor unit is abnormal, and for outputting a signal indicating a failure of said pump unit when it is diagnosed by said second diagnosis means that said motor unit is normal.

9. A diagnosis method of a fuel pump for an internal combustion engine, provided with a motor unit and a pump unit, comprising the steps of:
   diagnosing a function of said fuel pump;
   diagnosing whether or not said motor unit is abnormal when it is diagnosed that the function of said fuel pump is abnormal;
   outputting a signal indicating a failure of said motor unit when it is diagnosed that said motor unit is abnormal; and
   outputting a signal indicating a failure of said pump unit when it is diagnosed that said motor unit is normal.

10. A diagnosis method of a fuel pump for an internal combustion engine according to claim 9,
    wherein said step of diagnosing a function of said fuel pump comprises the steps of:
    detecting a fuel pressure on the downstream side of said fuel pump; and
    judging that the function of said fuel pump is abnormal when the fuel pressure is less than a slice level.

11. A diagnosis method of a fuel pump for an internal combustion engine according to claim 10,
    wherein said step of diagnosing a function of said fuel pump further comprises the step of;
    variably setting said slice level according to a drive control signal for said fuel pump.

12. A diagnosis method of a fuel pump for an internal combustion engine according to claim 9,
wherein said step of diagnosing an abnormality in said motor unit comprises the steps of:
detecting a voltage applied on said monitor unit; and
judging an abnormality in the voltage as an abnormality in said motor unit.

13. A diagnosis method of a fuel pump for an internal combustion engine according to claim 9,
wherein said step of diagnosing an abnormality in said motor unit comprises the steps of:
detecting the power consumption in said motor unit; and
judging an abnormality in the power consumption as an abnormality in said motor unit.

14. A diagnosis method of a fuel pump for an internal combustion engine according to claim 9, further comprising the step of;
giving a warning based on the signal indicating the failure of said motor unit and the signal indicating the failure of said pump unit.

\* \* \* \* \*